(12) United States Patent
Arnold et al.

(10) Patent No.: US 11,603,155 B2
(45) Date of Patent: Mar. 14, 2023

(54) BICYCLE SADDLE, SADDLE PAD, AND METHOD FOR PRODUCING A BICYCLE SADDLE OR SADDLE PAD

(71) Applicant: Ergon International GmbH, Koblenz (DE)

(72) Inventors: Franc Arnold, Koblenz (DE); Andreas Krause, Koblenz (DE)

(73) Assignee: Ergon International GmbH, Koblenz (DE)

( * ) Notice: Subject to any disclaimer, the term of this patent is extended or adjusted under 35 U.S.C. 154(b) by 0 days.

(21) Appl. No.: 17/396,241

(22) Filed: Aug. 6, 2021

(65) Prior Publication Data
US 2021/0362794 A1 Nov. 25, 2021

Related U.S. Application Data

(62) Division of application No. 16/328,040, filed as application No. PCT/EP2017/070628 on Aug. 14, 2017, now abandoned.

(30) Foreign Application Priority Data

Aug. 30, 2016 (DE) ............ 10 2016 216 309.4
Feb. 3, 2017 (DE) ............ 10 2017 201 775.9

(51) Int. Cl.
| | |
|---|---|
| B62J 1/22 | (2006.01) |
| B62J 1/26 | (2006.01) |
| B62J 1/18 | (2006.01) |
| B29C 44/12 | (2006.01) |
| B29C 65/48 | (2006.01) |
| B29C 65/00 | (2006.01) |

(Continued)

(52) U.S. Cl.
CPC ............ *B62J 1/22* (2013.01); *B29C 44/1271* (2013.01); *B29C 65/48* (2013.01); *B29C 66/727* (2013.01); *B29C 66/73921* (2013.01); *B62J 1/18* (2013.01); *B62J 1/26* (2013.01); *B29K 2023/06* (2013.01); *B29K 2023/083* (2013.01); *B29K 2023/12* (2013.01); *B29K 2075/00* (2013.01); *B29K 2623/06* (2013.01); *B29K 2623/083* (2013.01); *B29K 2623/10* (2013.01); *B29K 2675/00* (2013.01); *B29L 2031/3094* (2013.01)

(58) Field of Classification Search
CPC ............... B62J 1/005; B62J 1/22; B62J 1/26
See application file for complete search history.

(56) References Cited

U.S. PATENT DOCUMENTS

| | | |
|---|---|---|
| X532444 | 1/1895 | Christy |
| 3,131,969 A | 5/1964 | Kalter |

(Continued)

FOREIGN PATENT DOCUMENTS

| | | |
|---|---|---|
| DE | 9303259 | 6/1993 |
| DE | 102011057020 A1 | 6/2013 |

(Continued)

*Primary Examiner* — Timothy J Brindley
(74) *Attorney, Agent, or Firm* — The Webb Law Firm

(57) ABSTRACT

The invention relates to a bicycle saddle having a saddle shell, on the underside of which a frame is arranged. A saddle pad is arranged on the upper side of the saddle shell. According to the invention, the saddle pad has two padding elements for improved comfort, wherein in a preferred embodiment the inner padding element is made of TPU (thermoplastic polyurethane).

16 Claims, 3 Drawing Sheets

(51) Int. Cl.
  *B29K 23/00* (2006.01)
  *B29K 75/00* (2006.01)
  *B29K 623/00* (2006.01)
  *B29K 675/00* (2006.01)
  *B29L 31/30* (2006.01)

(56) References Cited

U.S. PATENT DOCUMENTS

| | | |
|---|---|---|
| 4,789,724 A | 12/1988 | Domb et al. |
| 5,108,076 A | 4/1992 | Chiarella |
| 5,203,607 A | 4/1993 | Landi |
| 5,348,369 A | 9/1994 | Yu |
| 6,131,994 A | 10/2000 | Yates |
| 6,472,449 B1 | 10/2002 | Heinemann et al. |
| 8,067,476 B2 | 11/2011 | Limerkens et al. |
| 2003/0158275 A1 | 8/2003 | McClelland et al. |
| 2006/0119148 A1 | 6/2006 | Bigolin |
| 2007/0176472 A1 | 8/2007 | Chuang |
| 2008/0007099 A1 | 1/2008 | Chuang |
| 2008/0197680 A1 | 8/2008 | Chuang |
| 2014/0054937 A1 | 2/2014 | Sam et al. |
| 2014/0070576 A1 | 3/2014 | Wu et al. |
| 2014/0159445 A1 | 6/2014 | Sam et al. |
| 2015/0252163 A1 | 9/2015 | Prissok et al. |
| 2016/0144914 A1 | 5/2016 | Jay |
| 2016/0325800 A1 | 11/2016 | Yu |

FOREIGN PATENT DOCUMENTS

| | | |
|---|---|---|
| DE | 202014006702 U1 | 10/2014 |
| DE | 202017106247 U1 | 12/2017 |
| DE | 202018003121 U1 | 11/2019 |
| DE | 202019104930 U1 | 12/2019 |
| EP | 0692510 A1 | 1/1996 |
| EP | 1174458 A1 | 1/2002 |
| EP | 1174459 A1 | 1/2002 |
| EP | 2109637 B1 | 10/2009 |
| EP | 2987708 A1 | 2/2016 |
| JP | 3217442 B2 | 10/2001 |
| JP | 3217442 U | 8/2018 |
| WO | 0002770 A1 | 1/2000 |
| WO | 0044821 A1 | 8/2000 |
| WO | 2014024156 A1 | 2/2014 |
| WO | WO-2018137971 A1 * | 8/2018 ................ B62J 1/08 |

* cited by examiner

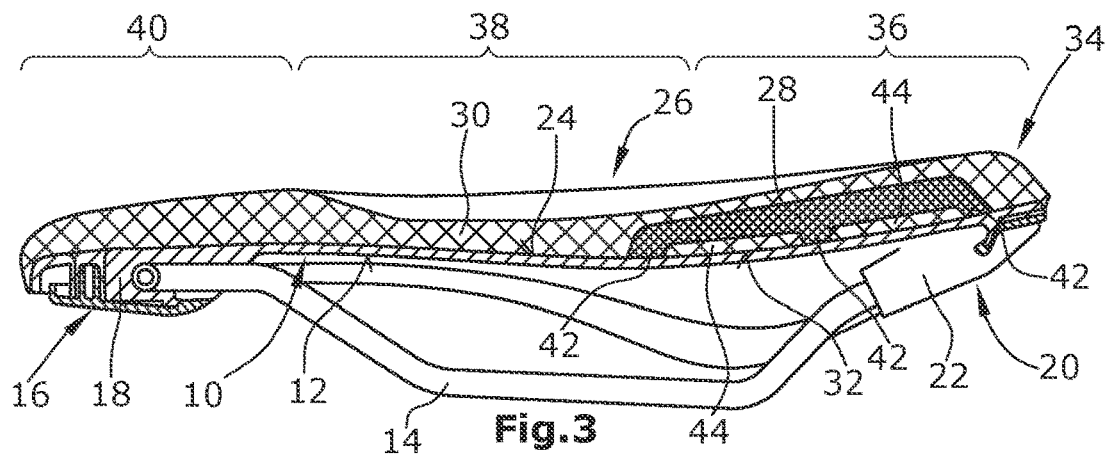
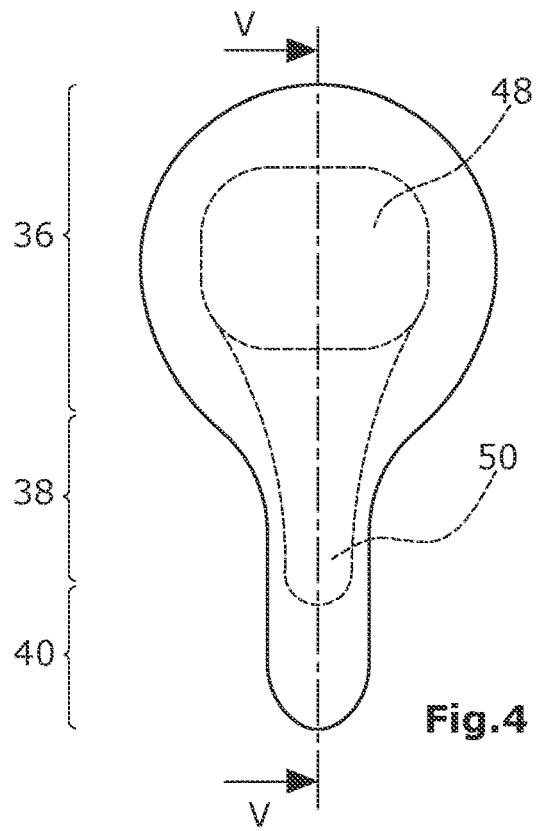
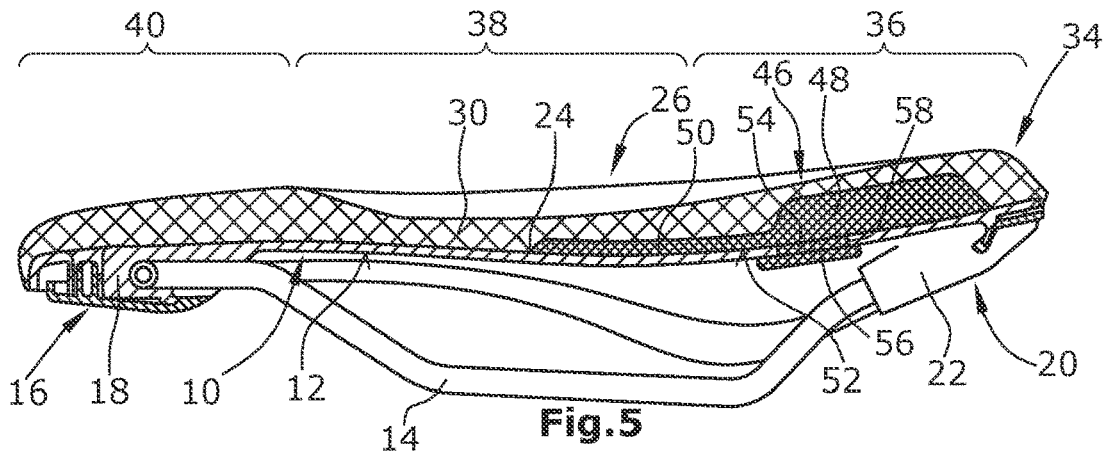

BICYCLE SADDLE, SADDLE PAD, AND METHOD FOR PRODUCING A BICYCLE SADDLE OR SADDLE PAD

CROSS-REFERENCE TO RELATED APPLICATIONS

This application is a divisional application of U.S. patent application Ser. No. 16/328,040 filed Feb. 25, 2019, which is the United States national phase of International Application No. PCT/EP2017/070628 filed Aug. 14, 2017, and claims priority to German Patent Application Nos. 10 2016 216 309.4 filed Aug. 30, 2016, and 10 2017 201 775.9 filed Feb. 3, 2017, the disclosures of all of which are hereby incorporated by reference in their entireties.

BACKGROUND OF THE INVENTION

The invention relates to a bicycle saddle, as well as to a saddle pad. The invention further relates to a method for producing a bicycle saddle or a saddle pad.

Bicycle saddles have a saddle shell whose lower side is usually connected with a saddle frame. A saddle pad is arranged on the upper side of the saddle shell. Typically, saddle pads are made of foamed material, such as PU foam. The saddle pads are glued onto the upper side of the saddle shell. Such in particular foamed saddle pads have good damping characteristics. However, in particular during longer trips, the pad may be compressed such that especially the seat bones of the user press on the upper side of the saddle shell so that pressure marks are formed. The reason for this is that the so-called rebound of such saddle pads is small. Therefore, it is known to provide gel pads in the seat region, i.e. in the rear region of the bicycle saddle in which the seat bones of the user are arranged. Such insert elements filled with a gelatin- or gel-like material are inserted into recesses in the saddle pad. Thereafter, the saddle pad with the inserted gel elements are covered with a textile element or the like. However, such gel elements only lead to a limited improvement of the sitting comfort, since the gel elements merely cause a better distribution of the forces occurring.

It is an object of the invention to provide a bicycle saddle, as well as a saddle pad with improved sitting comfort. Further, it is an object of the invention to provide a corresponding production method.

SUMMARY OF THE INVENTION

The object is achieved with a bicycle saddle as well as with a saddle pad according to the present disclosure. The object regarding the production method is also achieved according to the present disclosure.

A bicycle saddle includes a saddle shell typically made of hard plastic material. A saddle frame is arranged at the lower side of the saddle shell. The saddle frame serves for connection with the saddle support tube, wherein the saddle frame may also be integrally formed with the support tube. With common saddles, the saddle frame is an element made of metal bars that is connected both with a saddle tip directed in the traveling direction and with the rear of the saddle. Other connections between the saddle shell and the saddle frame or a connecting element to the saddle support tube corresponding to the saddle frame are known as well. A saddle pad is arranged on the upper side of the saddle shell. The same may be glued onto the upper side of the saddle shell or may be connected directly with the upper side of the saddle shell already during manufacturing, using corresponding manufacturing techniques.

With bicycle saddles according to the invention, the saddle pad includes at least two pad elements. The pad elements serve in particular to dampen the movements occurring when riding a bicycle, as well as to support the user in the most comfortable manner possible. The pad elements may also be made of different materials, the corresponding elements serving in particular for dampening and support.

In a first bicycle saddle according to the invention, the saddle pad includes at least one inner pad element and at least one outer pad element. According to the invention, the inner pad element is at least partly enclosed by the outer pad element. In this respect it is preferred that the inner pad element is enclosed by the outer pad element by overmolding or foaming the latter around the former. Thereby, it is possible in particular to make a connection between the outer and the inner pad element during the production off the outer pad element, since a corresponding material bond can be realized during the overmolding or foaming process.

It is particularly preferred that the inner pad element is arranged such that it is arranged on the upper side of the saddle shell. The inner pad element thus preferably rests on the upper side of the saddle shell or contacts the same. In particular, the inner pad element is connected with the saddle shell, wherein a connection may be made by gluing, locking or other types of fixation. According to the invention, it is thus preferred that an outer pad element is arranged at least in part above the inner pad element or that the outer pad element surrounds the inner pad element on the upper side in particular to a large extent. Thus, it is possible to combine two different materials. This is done in particular in the seat region. The material of the outer pad element can be selected such that it provides for good damping, i.e. that it is as soft as possible and designed in a manner comfortable to the user. The inner pad element may then be somewhat more solid and may preferably have good rebound characteristics, i.e. good supporting characteristics.

Preferably, a lower side of the inner pad element is in surface contact with the upper side of the saddle shell. In particular, the inner pad element is surface-connected with the upper side of the saddle shell, in particular glued or fixed in another manner.

In another embodiment, the inner pad element may have protrusions that contact the upper side of the saddle shell. In particular, these are protrusions formed as feet or webs so that there is no surface-contact between the inner pad element and the upper side of the saddle shell, but only the protrusions contact the saddle shell. This has the advantage that in the regions between the inner pad element and the upper side of the saddle shell, a further pad element, in particular of another material, can be introduced. Specifically, this is the same material as the material the outer pad element is made of, wherein it is preferred, in particular, that the material is a foamed or foamable material.

In a particularly preferred embodiment, the inner pad element has at least one retaining protrusion. With the inner pad element mounted, the retaining protrusion extends into at least one recess in the saddle shell. The recess may in particular be at least one indentation in the upper side of the saddle shell. The at least one retaining protrusion extending into the recess or indentation serves to define the position and possibly also to fix the inner pad element on the saddle shell. In this respect, it is particularly preferred that the recess is formed as a continuous opening in the saddle shell. Thereby, the manufacture of the saddle shell or the recess is already simplified. In this embodiment, the at least one retaining protrusion is preferably designed such that it extends through the opening. This is advantageous in that the provision of an inner pad element is visible from outside when looking at the saddle from below. Further, such a design of the recess as a continuous opening is advantageous, since the retaining protrusion can thereby be used in a simple manner to fix the inner pad element.

Particularly with respect to its design and dimensions, the retaining protrusion is formed such that it is possible to press it into the opening with a certain resistance, so that it is possible to fix the inner pad element in the opening by means of the retaining protrusion, e.g. due to a deformation of the retaining protrusion and/or the friction between the retaining protrusion and the edge of the opening. Preferably, the retaining protrusion has at least one extension that may e.g. of a bead-like design. The at least one extension serves to fix the inner pad element on the saddle shell or in the opening in the saddle shell. In particular, the at least one extension is designed such that, in the pressed-in or mounted state, the extension engages behind a lower side of the saddle shell. Thus, the extension is somewhat larger than the opening in this region. In particular, the extension may also be of annular shape, so that a very good fixation of the inner pad element on the saddle shell is possible by pressing the retaining protrusion into the opening.

In a preferred embodiment of the bicycle saddle, the at least one pad element is arranged in the seat region, i.e. in the rear part of the bicycle saddle. This is the region in which the user sits on the saddle and in which in particular the seat bones are located. Likewise, the inner pad element or an additional inner pad element may be arranged in the center region or perineal region of the bicycle saddle. This inner pad element may in particular be thinner, since the pressure load in this region is increased in particular only in sitting positions in which the user is bent forward. It is preferred that an inner pad element is designed such that it is arranged both in the seat region and in the center region. In particular, such a pad element is formed integrally. In this respect it is preferred that such a n inner pad element is thinner in the center region than in the seat region. Thereby, a very good improvement of the comfort is achieved.

In a particularly preferred embodiment, the inner pad element is entirely enclosed by the outer pad element which is made in particular by foaming. In this respect it is preferred that a lower side of the inner pad element is not or only partly enclosed by the outer pad element, since, in a preferred embodiment, this side of the inner pad element contacts the upper side of the saddle shell.

Preferably, a rear region of the inner pad element is not enclosed by an outer pad element. The rear region is a region of the inner pad element that is directed rearward with respect to the traveling direction. Preferably, the inner pad element is arranged or designed such that the rear region of the inner pad element is arranged at a rear side of the saddle shell, in particular in the region of the rear edge of the saddle shell. Not surrounding this region of an inner pad element with an outer pad element has, in particular, the advantage that the inner pad element is visible and, as such, a user can immediately realize that this is a bicycle saddle with a plurality of pad elements, in particular made from different materials.

In another bicycle saddle of the present invention, again, a saddle shell is provided at the lower side of which a saddle frame and at the upper side of which a saddle pad is arranged. Again, the pad element includes at least two pad elements. In this invention, which is an independent invention, the saddle pad has a main pad element and an auxiliary pad element. The main pad element is connected with an upper side of the saddle shell. The connection may be realized e.g. by gluing, but also directly by the production method. The main pad element has a recess or indentation in which the auxiliary pad element is arranged. The auxiliary pad element placed or inserted into the recess is glued in, for example. The main pad element may have a plurality of recesses in which one auxiliary pad element is arranged, respectively.

In a particularly preferred embodiment of this bicycle saddle, the main pad element is not covered or spanned with a textile material. However, it is preferred that the auxiliary pad element is provided with a textile material at least on the upper or outer side in particular to reduce friction.

The at least one auxiliary pad element may be arranged in a seat region or in a center region. It is particularly preferred to arrange such auxiliary pad elements in outer regions of the center region.

These are regions which are in contact with the inner sides of the thighs or against which the inner sides of the thighs rub during pedaling.

Corresponding to the above described inner pad element, the auxiliary pad element is preferably designed such that an auxiliary pad element arranged in the seat region is thicker than an auxiliary pad element arranged in the center region of the saddle. Specifically, either two separate auxiliary pad elements are provided or an auxiliary pad element is provided that is correspondingly integrally formed and covers both regions. If corresponding auxiliary pad elements are provided in particular in both the left and the right outer region of the center region, these pad elements may also be connected with an auxiliary pad element arranged in the center region or may be integrally formed.

A pad element of the present invention may in particular also be designed such that it is arranged both in the seat region and in the center region, wherein the pad element may again be formed by two connected auxiliary pad elements or one integrally formed pad element. In the center region the auxiliary pad element is preferably thinner than in the seat region.

It is preferred that, in particular for a reduction of friction and for increasing the comfort, the at least one auxiliary pad element is spanned with an in particular textile material at least on its outer side. Here, in particular such material is used that is suited and conventionally used for spanning saddle pads of bicycle saddles.

In a preferred embodiment, the auxiliary pad element is glued into the corresponding recess or indentation of the main pad element.

In a particularly preferred embodiment, the inner pad element or the main pad element is formed as an elastomer body. In particular, the elastomer body preferably includes thermoplastic elastomers (TPE). Preferably, foams are used, such as PU foams. In particular, closed-cell foams are preferred. The inner pad element or the main pad element in particular includes TPU (thermoplastic polyurethane) and, as is particularly preferred, is made from this material. The material produced by BASF under the product name "Infinergy" is particularly suited for this purpose. Methods for producing TPU are described e.g. in EP 692 510, WO 00/44821, EP 11 74 459 and EP 11 74 458. Further, it is preferred that the inner pad element or the main pad element is made from EVA (ethylene vinyl acetate) or the main pad element is made from a material that includes EVA. Further, EPP (expanded polypropylene), thermoplastic elastomers (TPE) and EPE (expanded polyethylene) may be used as materials. A combination of these materials or a combination of these materials with other materials is also possible, e.g. in a multi-layered structure. In particular, mixtures with co- or terpolymers may also be used. Thereby, different damping and movement characteristics of the seat cushion can be obtained. It is also possible to provide a higher compaction of the corresponding materials in different regions, so that the damping and movement characteristics can be influenced thereby.

Moreover, a thermoplastic elastomeric spherical foam is suited as a material for the elastomer body. Such a foam is offered by Sekisui under the product name "ELASTIL". In particular, this is a closed-cell foam. In a preferred embodiment, according to the invention, the elastomer body includes a thermoplastic elastomeric spherical foam, such as in particular Elastil, or is made from the same. A combination with the other materials described, which are suitable for forming the elastomer body, is also possible.

Another well suited material for forming the elastomer body is a polyester-based PU material. In this respect, the material offered by BASF under the product name "Elastopan" is particularly suited. Preferably, the elastomer body includes such a material or is made therefrom, while it is again possible to combine this material with other materials described.

It is particularly preferred that the elastomer body includes one or a plurality of particulate foams and is, in particular, made from one or a plurality of particulate foams. As a base material, E-PTU, EPP, EPS, EPE or similar foams are particularly preferred. Generally, particulate foams are formed by small spheres of the expanded base material. These particles formed as spheres or other bodies are given their final shape in a tool, such as a casting mold or the like, using temperature and, possibly, water vapor. In particular, particulate foams have the advantage that they have a low density, a good heat/cold insulation and good damping characteristics.

In a particularly preferred embodiment, the elastomer body, i.e. the inner pad element or the main pad element, has an elasticity module of 0.1 to 10 MPa, in particular 0.1 to 5 MPa and particularly preferred 0.1 to 1.0 MPa. The particularly preferred material "Infinergy E-TPU" has a modulus of elasticity between 0.1 and 0.5 MPa.

Further, it is particularly preferred that the elastomer body has a low weight due to its low density. Specifically, the elastomer body has a density of less than 1 g/cm³, particularly preferred less than 0.5 g/cm³, and in particular less than 0.2 g/cm³. One of the particularly preferred materials, the material Elastil, has a density in a range from 0.05 to 0.2 g/cm³.

The rebound behavior of the inner pad element or the main pad element preferably is in a range of preferably more than 30%, in particular more than 40% and particularly preferred more than 50%.

The outer pad element or the auxiliary pad element is preferably made of a foamable material, in particular foamed plastic material. PU foam is particularly suited.

The saddle shell preferably includes PP, PA6 or PA12 as a material or is made of this material. According to the invention, the modulus of elasticity of the saddle shell is in a range from 1000 to 10000 MPa, preferably in a range from 2500 to 6000 MPA, and particularly preferred in a range from 3000 to 5000 MPa. The use of PP (E-modulus: 1100 to 1450 MPa), PP GF20 (E-modulus ca. 2900 MPa), and/or PA 6 GF15 (E-modulus: 4500 to 6500 MPa).

A further independent invention relates to a saddle pad for a bicycle saddle, the saddle pad of the invention being suited in particular for the above described bicycle saddles.

The saddle pad of the invention includes at least two pad elements. In a preferred embodiment, a first pad element is made of TPU and/or EVA and/or EPP and/or TPE and/or EPE or includes that material. In this respect, the first pad element may also be made of combinations of these materials or of a combination with other materials. The first pad element is thus made of a material which, in a preferred embodiment, corresponds to the material the inner pad element or the main pad element is made of. The second pad element is a pad element of foamable material. It is particularly preferred that this is a PU foam. The second pad element is thus made corresponding to the preferred embodiment of the outer pad element or the auxiliary pad element or includes the corresponding material.

In a particularly preferred embodiment, the first pad element is at least partly enclosed by the second pad element, in particular overmolded or encapsulated with foam.

The invention further relates to a bicycle saddle with such saddle pad.

For manufacturing the saddle pad, it is preferred, according to the invention, to first fix a first pad element of TPU or another material defined above in a casting mold. In the next method step, material is introduced into the casting mold for forming the second pad element, the material of the second pad element particularly being PU foam or one of the other material defined above. In a preferred embodiment, the first pad element is clamped in the casting mold. Thus, the first pad element contacts e.g. a cover and an opposite bottom element of the casting mold. During the subsequent introduction of the material for the second pad element and the subsequent foaming of this material, a saddle pad is thus obtained, in which the first pad element is not enclosed or foam-encapsulated by the second pad element in the two regions in which it contacts the casting mold. Thereby, it is in particular possible to produce such saddle pads as described with respect to the bicycle saddles of the invention.

In a preferred embodiment, the first pad element is prefabricated. For this purpose, the first pad element is preferably prefabricated in a separate mold. The prefabricated first pad element is then placed into the casting mold.

In a preferred development of the method for producing the saddle pad, a saddle cover or a saddle pad cover may be placed in the casting mold before inserting the first pad element. The cover is in particular made of a textile material and, in a particularly preferred embodiment, is retained in the casting mold by vacuum. Thereby, an extremely smooth surface may be realized.

In another method for producing a bicycle saddle, which is an independent invention, a first step provides that an inner pad element is fastened on an upper side of the saddle shell. Thereafter, the saddle shell is placed in a casting mold together with the inner pad element fastened thereon. In the subsequent step, a material is introduced into the casting mold to form an outer pad element. Here, pad elements are preferably produced by foaming this material in the casting mold. By fastening the inner pad element on the saddle shell, it is in particular possible to provide a space between the upper side of the inner pad element, i.e. the upper side of the pad element averted from the upper side of the saddle shell, and an inner side of the casting mold. The material of the outer pad element enters into the same, so that the inner pad element is at least partly enclosed, in particular overmolded or foam-encapsulated, by the outer pad element.

The inner pad element may also be designed or formed such that the same contacts the inner side of the casting form in individual regions, e.g. in the region of a rear side of the pad element. As a result, the inner pad element is not enclosed by the outer pad element in this region.

The inner pad element, which is preferably made of TPU, is preferably prefabricated. It is particularly preferred that the inner pad element has a retaining protrusion as described above. The same may be pressed into a recess of the saddle shell which is formed in particular as a continuous opening. Thereby, as described above with reference to the bicycle saddle, it is possible to arrange or fix the at least one inner pad element on the saddle shell in a simple manner.

In a preferred embodiment, the saddle shell is placed into the casting mold together with the at least one inner pal fastened thereon, the upper side being directed downward. This is advantageous for the introduction of the material of the outer pad element that may in particular be poured in or inserted. In this respect, it is particularly preferred that the inner pad element is fixed on the upper side of the saddle shell in order to avoid the inner pad element from falling off or sinking down in the casting mold during the production process.

In a further preferred embodiment, the saddle cover is placed into the casting mold, before the saddle shell is placed into the casting mold. In particular, this is a saddle cover of textile material or another material conventionally used for spanning saddles. In order to realize a smooth surface, it is preferred that the saddle cover is retained in the casting mold by vacuum.

Typically, the saddle shell is already connected with the saddle frame prior to the production of the bicycle saddle, without this being necessarily so.

The method of the present invention is developed in an advantageous manner, in particular as described above with reference to the bicycle saddle having an inner and an outer pad element.

In a preferred embodiment, the production of the bicycle saddle with a main and an auxiliary pad element is effected such, according to the invention, that the saddle shell is placed into a casting mold. The inner surface of the casting mold is designed such that it forms the recess in the main pad element. In the next step, the material for the main pad element is introduced, the material preferably being TPU. After the production of the main pad element which is fixedly connected directly with the upper side of the saddle shell, the additional pad element can be arranged in the recess. The additional pad element which is preferably made of foamed material and is possibly spanned with a saddle or pad cover, is preferably produced in a separate process. The method of the present invention for producing the bicycle saddle with a main pad element and an auxiliary pad element is preferably developed in an advantageous manner, as described above with reference to the corresponding saddle.

The use of TPU as the pad material has the basic disadvantage that the material is made from a plurality of sphere-like or spherical structures. As such, the surface of the material is relatively rough or uneven. By surrounding, in particular foam-encapsulating, the TPU with a foamable material, this unevenness can be smoothed. In additions, by providing a corresponding outer material and/or saddle cover, a surface with less friction can be made.

When using TPU for the main pad element, the same is visible in large parts of the saddle, wherein, in this case, an auxiliary pad element of foamed material or the like is provided in particular in the seat region, so that the comfort is improved.

The inventions will be explained in more detail hereinafter with reference to preferred embodiments and to the accompanying drawings.

BRIEF DESCRIPTION OF THE DRAWINGS

In the Figures:

FIG. 3 is a schematic sectional view along line II-II through an alternative embodiment, FIG. 4 is a schematic top plan view on another embodiment of a bicycle saddle, FIG. 5 is a schematic sectional view along line V-V in FIG. 4.

DETAILED DESCRIPTION OF THE INVENTION

Figure 1:
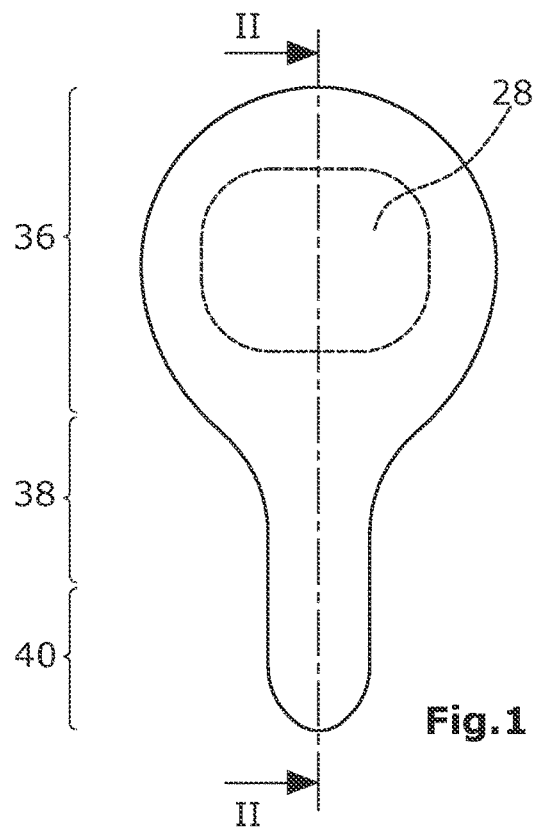
FIG. 1 is a schematic top plan view of a first preferred embodiment of a bicycle saddle.

In the different preferred embodiments of the inventions described hereinafter, similar and identical parts are respectively identified by the same reference numerals.

The bicycle saddles illustrated each have a saddle shell 10. A saddle frame 14 is connected with a lower side 12 of the saddle shell 10. Here the saddle frame 14 is formed in particular by two metal bars of which the rear bar is visible in sectional views, as shown in FIGS. 2, 3, 5, and 7. In the region of a saddle tip 16, the two bars are fixed in a protrusion 18 of the saddle shell 10. In the region of the rear side 20 of the saddle, the two bars of the frame 14 are each fixed separately in a protrusion 22 of the saddle shell 10.

On an upper side 24 of the saddle shell 10, a saddle pad 26 is arranged which is built-up differently in the different embodiments.

Figure 2:
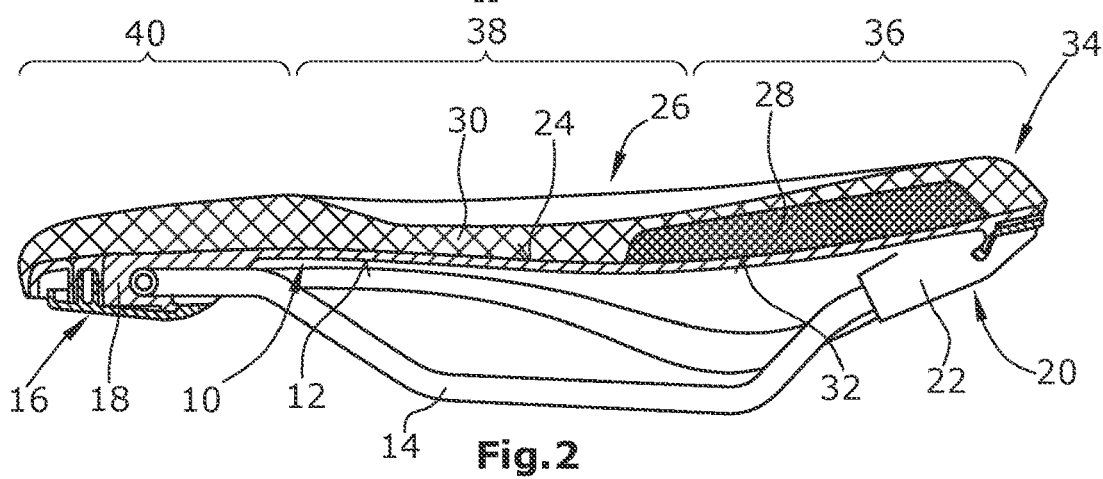
FIG. 2 is a schematic sectional view along the line II-II in FIG. 1.

In the first preferred embodiment, as shown in FIGS. 1 and 2, the saddle pad 26 has an inner pad element 28 as well as an outer pad element 30 surrounding the inner pad element 28 substantially completely. The inner pad element 28 is preferably made of TPU and the outer pad element 30 is made of a PU foam. The inner pad element 28 contacts the upper side 24 of the saddle shell 10 by a flat lower side 32. Possibly, the inner pad element 28 is connected with the upper side 24 of the saddle shell 10 by gluing. The PU foam serves to produce the outer pad element 30 which surrounds all sides of the inner pad element 28 except for the lower side 32. Possibly, the inner pad element 28 may also be arranged such that the outer pad element 30 does not surround the same e.g. in the region of a rear side 34 so that the inner pad element 28 is visible in this region.

In the embodiment illustrated in FIGS. 1 and 2, the inner pad element 28 is arranged in a seat region 36 of the saddle. Contiguous to the seat region 36 are a center region 38 as well as a saddle tip 40. In this embodiment, only a saddle pad of PU foam is arranged both in the center region 38 and in the region of the saddle tip 40, so that only the outer pad 30 is provided in this region.

Figure 2A:
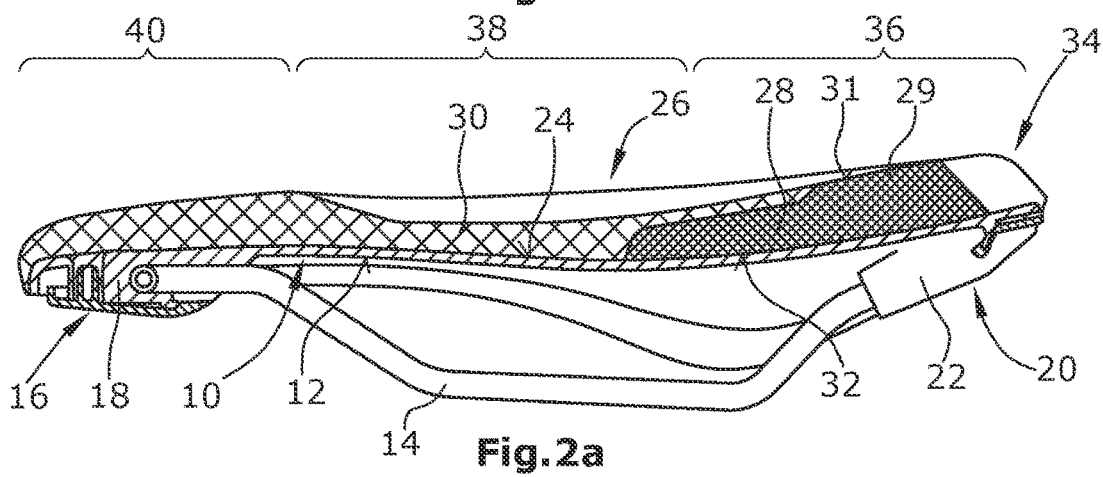
FIG. 2a is a schematic sectional view through an alternative embodiment to FIG. 2.

In an alternative embodiment in FIG. 2a, similar and identical parts are identified by the same reference numerals. The only difference between the embodiments illustrated in FIGS. 1 and 2a is in the design of the inner pad element 28. In the design shown in FIG. 2a, the inner pad element 28 has an upward extending protrusion 20. The protrusion 29 is preferably formed integrally with the inner pad element 28. In this embodiment, an upper side 31 of the protrusion 29 is not covered by the outer pad element 30 so that the upper side 31 of the protrusion 29 is well visible to the user.

In an alternative embodiment, as shown in FIG. 3, the inner pad element 28 is designed such that it has protrusions or feet 42 directed towards the upper side 24 of the saddle shell 10. An inner pad element 28 of such design is connected, e.g. glued, with the upper side 24 of the saddle shell 10 in particular via the feet 24. By providing the feet it is possible to form regions 44 beneath the inner pad element 28. These may be designed as cavities or may also be filled with the foam in the material of the outer pad element 30.

With the embodiment illustrated in FIG. 3, the damping and rebound characteristics of the saddle can be varied in the seat region 36.

In an alternative embodiment, the inner pad element 28 illustrated in FIG. 3 can also have a protrusion 29 similar to the embodiment illustrated in FIG. 2a.

The inner pad element may also, as illustrated in FIG. 5, be designed as an inner pad element 46 or may have another shape. In the seat region 36, the inner pad element 46 is designed similar to the inner pad element 28 illustrated in FIG. 2. In addition, the inner pad element 46 with the part 48 arranged in the seat region is provided with a part 50 of the inner pad element 46 in the center region 38. Both parts 48, 50 of the inner pad element 46 are formed integrally. The part 50 of the inner pad element 46 is thinner or has a lower height than the part 498 arranged in the seat region 48.

A retaining protrusion 54 is arranged on a lower side 52 of the inner pad element 46. The retaining protrusion 54 is connected with an extension 56 which in the embodiment illustrated is designed as a bead. In the embodiment illustrated, the retaining protrusion 54 is cylindrical and the extension 56 is designed as an annular bead. In the saddle shell 10, a recess or opening 58 is arranged which in the embodiment illustrated is continuous. For fixing the inner pad element 46, it is thus possible to press the retaining protrusion 54, together with the bead 56, through the opening 58 in FIG. 5 from above. Owing to the bead 56, which has a larger dimension than the opening 58, a secure retention of the inner pad element 46 is achieved.

For producing the bicycle saddles illustrated in FIGS. 1-5 or described above, the corresponding inner pad element 28 or 46 is produced in a corresponding mold in a first step. The inner pad element 28, 46 is preferably made of TPU and in particular the material sold by BASF under the trademark "Infinergy". In the next step, the inner pad element 28, 46 is connected with or fixed to the upper side 24 of the saddle shell 10. In the embodiments illustrated in FIGS. 1-3, this is effected e.g. by gluing. In the embodiment illustrated in FIGS. 4 and 5, the connection is made by pressing the retaining protrusion 54 into the opening 58. In the next step, the saddle shell is placed into a casting mold together with the inner pad element 28, 46 fastened thereto and together with the frame 14 provided on the outer side. The placing into the casting mold is effected such that the saddle frame is directed upward. Thereafter, the material for producing the outer pad element 30 is filled into the casting mold and is foamed. Due to the saddle being placed into the casting mold with the saddle frame directed upward, filling in the material for the outer pad element 30 is possible in a simple manner. By fixing the inner pad element 28, 46 to the saddle shell 10, it is ensured that the element remains in contact with the upper side 24 of the saddle shell 10.

Possibly, prior to placing the saddle shell into the casting mold, the same can be lined with a saddle cover. The saddle cover is fixed in the casting mold preferably by means of vacuum so that a smooth surface is realized.

Figure 6:
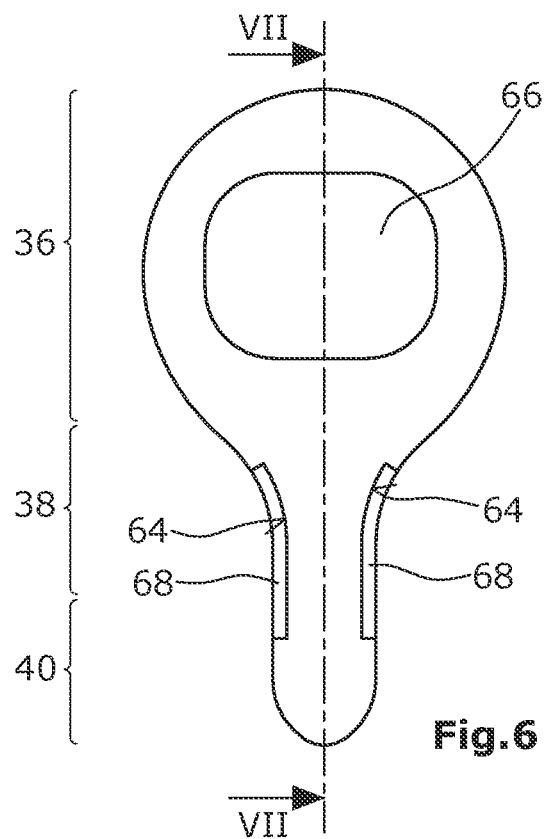
FIG. 6 is a schematic top plan view on another embodiment of a bicycle saddle.
Figure 7:
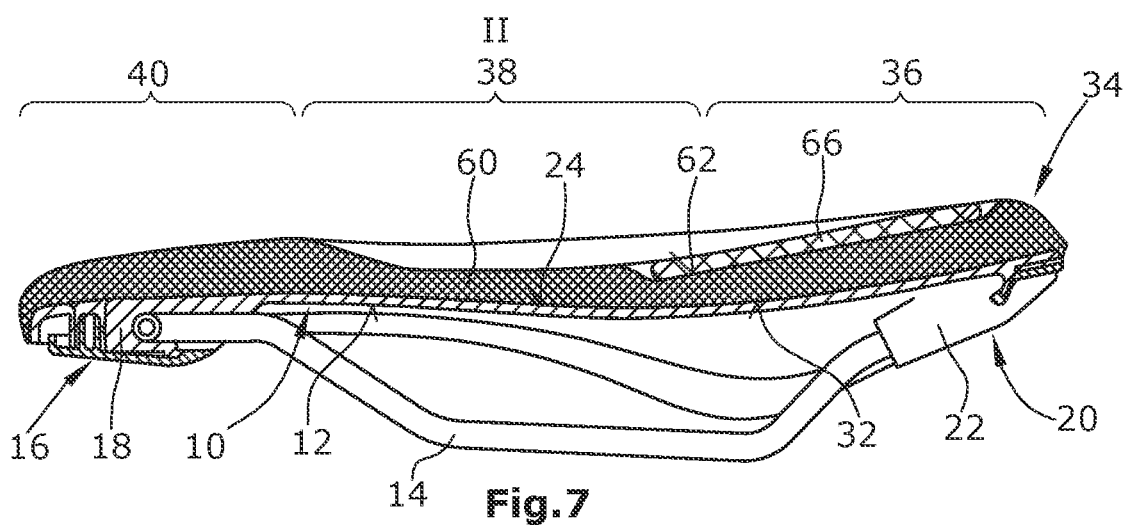
FIG. 7 is a schematic sectional view along line VII-VII in FIG. 6.

In the embodiment illustrated in FIGS. 6 and 7, a main pad element 60 is connected with the upper side 24 of the saddle shell 10. In this case, the main pad element 60 is preferably made of TPU. The main pad element 60 can be produced in a separate mold and be glued on the upper side 24 thereafter. Likewise, it is possible to arrange the material for producing the main pad element 60 in a mold together with the saddle shell 10. When TPU is used to produce the main pad element 60, the raw material is exposed to vapor. Therefore, it is advantageous that the saddle shell 10 has small passage openings for introducing vapor. The shape main pad element 60 is designed such that at least one recess 62 is provided in the seat region 36. In the center region 38, one further recess 64 (FIG. 6) is provided on either side. Auxiliary pad elements 66, 68 are arranged n all recesses 62, 64. The auxiliary pad elements 66, 68 are made in particular of PU foam and are covered with a saddle cover material preferably on the outer sides. Thus, by arranging the auxiliary pad elements 68, friction is reduced in particular at the sides in the center portion 38. By the combination of the two pad elements 60, 66, a good damping and a good rebound behavior are achieved in the seat region 36.

As an alternative, it is possible in all above described embodiments to produce the saddle pads 26 independently of the saddle shell. The corresponding saddle pads which include at least two different pad elements, can then be e.g. glued on the upper side 24 of the saddle shell 10.

While several examples of the invention are shown in the accompanying figures and described in detail hereinabove, other aspects will be apparent to, and readily made by, those skilled in the art without departing from the scope and spirit of the disclosure. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. A bicycle saddle comprising a saddle shell,
a saddle frame connected with a lower side of the saddle shell, and
a saddle pad arranged on an upper side of the saddle shell, the saddle pad comprising at least two pad elements,
wherein an inner pad element is enclosed at least in part by an outer pad element,
wherein the inner pad element is arranged in a seat region of the bicycle saddle,
wherein a lower side of the inner pad element is in surface contact with the upper side of the saddle shell, and
wherein a rear region of the inner pad element is not enclosed by an outer pad element so that the rear region of the inner pad element is visible.

2. The bicycle saddle of claim 1, wherein the inner pad element is arranged on the upper side of the saddle shell.

3. The bicycle saddle of claim 1, wherein the inner pad element comprises at least one retaining protrusion extending into a recess of the saddle shell.

4. The bicycle saddle of claim 3, wherein the recess is formed as a passage opening in the saddle shell.

5. The bicycle saddle of claim 3, wherein the retaining protrusion extends through the passage opening.

6. A bicycle saddle comprising a saddle shell,
a saddle frame connected with a lower side of the saddle shell, and
a saddle pad arranged on an upper side of the saddle shell, the saddle pad comprising at least two pad elements,
wherein an inner pad element is enclosed at least in part by an outer pad element,
wherein the inner pad element is arranged in a seat region of the bicycle saddle,
wherein a lower side of the inner pad element is in surface contact with the upper side of the saddle shell,
wherein a rear region of the inner pad element is not enclosed by an outer pad element,
wherein the inner pad element comprises at least one retaining protrusion extending into a recess of the saddle shell, and
wherein the retaining protrusion has at least one extension configured for fixing the inner pad element on the saddle shell.

7. The bicycle saddle of claim 6, wherein the at least one extension engages behind the saddle shell.

8. The bicycle saddle of claim 1, wherein the inner pad element is arranged in a center region of the bicycle saddle.

9. A bicycle saddle comprising a saddle shell,
a saddle frame connected with a lower side of the saddle shell, and
a saddle pad arranged on an upper side of the saddle shell, the saddle pad comprising at least two pad elements,
wherein an inner pad element is enclosed at least in part by an outer pad element,
wherein the inner pad element is arranged in a seat region of the bicycle saddle,
wherein a lower side of the inner pad element is in surface contact with the upper side of the saddle shell,
wherein a rear region of the inner pad element is not enclosed by an outer pad element, and
wherein the inner pad element comprises a common inner pad element arranged in a seat region and in a center region.

10. The bicycle saddle of claim 9, wherein a portion of the inner pad element arranged in the center region is thinner than a portion of the inner pad element arranged in the seat region.

11. The bicycle saddle of claim 1, wherein the rear region of the inner pad element is arranged on a rear side of the saddle shell.

12. A bicycle saddle comprising a saddle shell,
a saddle frame connected with a lower side of the saddle shell, and
a saddle pad arranged on an upper side of the saddle shell, the saddle pad comprising at least two pad elements,
wherein an inner pad element is enclosed at least in part by an outer pad element,
wherein the inner pad element is arranged in a seat region of the bicycle saddle,
wherein a lower side of the inner pad element is in surface contact with the upper side of the saddle shell,
wherein a rear region of the inner pad element is not enclosed by an outer pad element, and
wherein the inner pad element comprises at least one of TPU, EVA, EPP, TPE, EPE, (expanded polyethylene) or a combination thereof.

13. The bicycle saddle of claim 1, wherein the outer pad element comprises PU-foam.

14. A bicycle saddle comprising a saddle shell,
a saddle frame connected with a lower side of the saddle shell, and
a saddle pad arranged on an upper side of the saddle shell, the saddle pad comprising at least two pad elements,
wherein an inner pad element is enclosed at least in part by an outer pad element,
wherein the inner pad element is arranged in a seat region of the bicycle saddle,
wherein a lower side of the inner pad element is in surface contact with the upper side of the saddle shell,
wherein a rear region of the inner pad element is not enclosed by an outer pad element, and
wherein the saddle pad comprises at least one pad element made of at least one of TPU, EVA, EPP, TPE, or EPE, and at least one pad element made of a foamable material.

15. The saddle pad of claim 14, wherein an inner pad element comprising at least one of TPU, EVA, EPP, TPE, or EPE is enclosed by an outer pad element which is made of foamed material.

16. A bicycle saddle comprising a saddle shell,
a saddle frame connected with a lower side of the saddle shell, and
a saddle pad arranged on an upper side of the saddle shell, the saddle pad comprising at least two pad elements,
wherein at least one of the pad elements comprises at least one of TPU, EVA, EPP, TPE, or EPE, and at least one of the pad elements comprises a foamable material,
wherein a rear region of an inner pad element is not enclosed by an outer pad element so that the rear region of the inner pad element is visible.

* * * * *